United States Patent
McCourt et al.

(10) Patent No.: US 12,033,036 B2
(45) Date of Patent: Jul. 9, 2024

(54) SYSTEMS AND METHODS FOR IMPLEMENTING AN INTELLIGENT TUNING OF MULTIPLE HYPERPARAMETER CRITERIA OF A MODEL CONSTRAINED WITH METRIC THRESHOLDS

(71) Applicant: Intel Corporation, Santa Clara, CA (US)

(72) Inventors: Michael McCourt, San Francisco, CA (US); Bolong Cheng, San Francisco, CA (US); Taylor Jackie Spriggs, San Francisco, CA (US); Halley Vance, San Francisco, CA (US); Olivia Kim, San Francisco, CA (US); Ben Hsu, San Francisco, CA (US); Sarth Frey, San Francisco, CA (US); Patrick Hayes, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1008 days.

(21) Appl. No.: 16/943,643

(22) Filed: Jul. 30, 2020

(65) Prior Publication Data
US 2021/0034924 A1 Feb. 4, 2021

Related U.S. Application Data

(60) Provisional application No. 62/880,895, filed on Jul. 31, 2019.

(51) Int. Cl.
*G06N 20/00* (2019.01)
*G06F 9/54* (2006.01)
(Continued)

(52) U.S. Cl.
CPC ............. *G06N 20/00* (2019.01); *G06F 9/541* (2013.01); *G06F 18/2115* (2023.01); *G06F 18/2148* (2023.01); *G06N 20/20* (2019.01)

(58) Field of Classification Search
CPC .......... G06N 20/00; G06N 20/20; G06N 5/01; G06N 3/082; G06F 9/541; G06F 18/2115; G06F 18/2148
See application file for complete search history.

(56) References Cited

U.S. PATENT DOCUMENTS 10,217,061 B2  2/2019  Hayes et al.
10,282,237 B1  5/2019  Johnson et al.
(Continued)

OTHER PUBLICATIONS

Tartakovsky et al., "Deep Learning Hyperparameter Optimization with Competing Objectives," Nvidia Technoical Blog, Aug. 3, 2017, retrieved from <https://developer.nvidia.com/blog/sigopt-deep-learning-hyperparameter-optimization/> on Nov. 13, 2023, 10 pages.

*Primary Examiner* — Joseph J Dallo
(74) *Attorney, Agent, or Firm* — Hanley, Flight & Zimmerman, LLC

(57) ABSTRACT

Systems and methods for tuning hyperparameters of a model include receiving a tuning request for tuning hyperparameters, the tuning request includes a first and a second objective function for the machine learning model. The first and second objective functions may output metric values that do not improve uniformly. Systems and methods additionally include defining a joint tuning function that is based on a combination of the first and second objective functions; executing a tuning operation; identifying a Pareto efficient frontier curve defined by a plurality of distinct hyperparameter values; applying metric thresholds to the Pareto efficient frontier curve; demarcating the Pareto efficient frontier curve into at least a first infeasible section and a second feasible section; searching the second feasible section of the
(Continued)

Pareto efficient frontier curve for one or more proposed hyperparameter values; and identifying at least a first set of proposed hyperparameter values based on the search.

20 Claims, 4 Drawing Sheets

(51) Int. Cl.
    *G06F 18/2115*     (2023.01)
    *G06F 18/214*     (2023.01)
    *G06N 20/20*     (2019.01)

(56) References Cited

U.S. PATENT DOCUMENTS

| | | |
|---|---|---|
| 10,528,891 B1 | 1/2020 | Cheng et al. |
| 10,558,934 B1* | 2/2020 | Cheng .................. G06N 20/00 |
| 2014/0172773 A1* | 6/2014 | Schmidt ............ G06F 16/24578 |
| | | 706/54 |
| 2018/0055394 A1* | 3/2018 | Sohrabpour ............ A61B 5/369 |
| 2018/0356949 A1* | 12/2018 | Wang ........................ G06N 7/01 |
| 2019/0377984 A1* | 12/2019 | Ghanta ............... G06F 18/2155 |
| 2020/0097856 A1* | 3/2020 | Cheng ...................... G06N 7/01 |
| 2020/0302342 A1* | 9/2020 | Cheng ...................... G06N 7/01 |

* cited by examiner

SYSTEMS AND METHODS FOR IMPLEMENTING AN INTELLIGENT TUNING OF MULTIPLE HYPERPARAMETER CRITERIA OF A MODEL CONSTRAINED WITH METRIC THRESHOLDS

CROSS-REFERENCE TO RELATED APPLICATIONS

This application claims the benefit of U.S. Provisional Application No. 62/880,895, filed 31 Jul. 2019, which is incorporated herein its entirety by this reference.

TECHNICAL FIELD

The inventions relate generally to complex model optimization and machine learning fields, and more specifically to a new and useful application program interface and techniques for intelligent hyperparameter optimization and training of models in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained using data samples as machine learning training input and based on the hyperparameters of the machine learning model set prior to the training of the model. As referenced in passing the hyperparameters of the machine learning models are parameters whose values are set prior to the commencement of the machine learning process rather than derived by the machine learning model during training. Example include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively enable optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

BRIEF SUMMARY OF THE INVENTION(S)

In one embodiment, the method for tuning hyperparameters for improving an effectiveness including one or more objective performance metrics of a machine learning model includes: receiving a multi-criteria tuning request for tuning hyperparameters of a machine learning model, the multi-criteria tuning request includes a first objective function and a second objective function for the machine learning model, wherein the first objective function and the second objective function output metric values that do not improve uniformly; defining a joint tuning function that is based on a combination of the first objective function and the second objective function; executing a tuning operation based on a tuning of the joint tuning function; identifying a Pareto efficient frontier curve defined by a plurality of distinct hyperparameter values based on the execution of the tuning operation; applying one or more metric thresholds to the Pareto efficient frontier curve; demarcating the Pareto efficient frontier curve into at least a first infeasible section and a second feasible section based on the application of the one or more metric thresholds; searching the second feasible section of the Pareto efficient frontier curve for one or more proposed hyperparameter values; and identifying at least a first set of proposed hyperparameter values based on the search.

In one embodiment, applying the one or more metric thresholds to the Pareto efficient frontier curve includes: [i] identifying a first plurality of metric values along the Pareto efficient frontier curve that do not satisfy the one or more metric thresholds; [ii] identifying a second plurality of metric values along the Pareto efficient frontier curve that satisfy the one or more metric thresholds; [iii] setting the first plurality of metric values as infeasible; and [iv] setting the second plurality of metric values as feasible.

In one embodiment, searching the second feasible section of the Pareto efficient frontier curve for one or more proposed hyperparameter values includes: bypassing hyperparameter values associated with each of the first plurality of metric values; identifying at least a first set of proposed hyperparameter values based on the search includes: selecting the first set of proposed hyperparameter values based on an evaluation of hyperparameter values associated with the second plurality of metric values.

In one embodiment, applying the one or more metric thresholds to the Pareto efficient frontier curve includes: subjugating each of a plurality of metric values along the Pareto efficient frontier curve that do not satisfy the one or more metric thresholds, wherein the subjugation causes hyperparameter values associated with the plurality of metric values to be invisible to search.

In one embodiment, searching the second feasible section of the Pareto efficient frontier curve for one or more proposed hyperparameter values includes: only searching for the proposed hyperparameter values that are visible to search.

In one embodiment, applying the one or more metric thresholds to the Pareto efficient frontier curve includes: [i] designating one or more sections of the Pareto efficient frontier curve having a plurality of metric values as valid if the plurality of metric values along the one or more sections satisfy the one or more metric thresholds; [ii] isolating the one or more sections of the Pareto efficient frontier curve from one or more other sections of the Pareto efficient frontier curve having a plurality of distinct metric values that do not satisfy the one or more metric thresholds; and [iii] extracting the one or more sections of the Pareto efficient frontier curve for performing the search based on the isolating.

In one embodiment, searching the second feasible section of the Pareto efficient frontier curve for one or more proposed hyperparameter values includes: searching for the proposed hyperparameter values within the one or more sections of the Pareto efficient curve based on the isolation and extraction.

In one embodiment, applying the one or more metric thresholds to the Pareto efficient frontier curve includes: rendering opaque to search a plurality of metric values along the Pareto efficient frontier curve that do not satisfy the one or more metric thresholds, and maintaining a transparent state to search each of a plurality of metric values along the Pareto efficient curve that satisfy the one or more metric thresholds.

In one embodiment, searching the second feasible section of the Pareto efficient frontier curve for one or more proposed hyperparameter values includes: searching for the proposed hyperparameter values within the one or more sections of the Pareto efficient curve based on the transparent state of each of the plurality of metric values along the Pareto efficient curve that satisfy the one or more metric thresholds.

In one embodiment, the method includes implementing an application programming interface that is in operable communication with a hyperparameter tuning service that executes at least the tuning operation, wherein via the application programming interface one or more parameters of the multi-criteria tuning request are defined including: defining the first objective function of the model, defining the second objective function of the model, defining the one or more metric thresholds for constraining a hyperparameter search space during the tuning operation.

In one embodiment, Pareto efficient frontier curve comprises a curve having a convex shape; and searching the second feasible section of the Pareto efficient frontier curve for one or more proposed hyperparameter values includes: searching along the convex shape within the second feasible section of the Pareto efficient frontier curve for identifying the one or more proposed hyperparameter values.

In one embodiment, Pareto efficient frontier curve comprises a curve having a non-convex shape; and searching the second feasible section of the Pareto efficient frontier curve for one or more proposed hyperparameter values includes: searching along the non-convex shape within the second feasible section of the Pareto efficient frontier curve for identifying the one or more proposed hyperparameter values.

In one embodiment, executing the tuning operation includes building a population of possible hyperparameter values within a hyperparameter search space based on the joint tuning function; identifying an emergence of a general convex or non-convex shape of the Pareto efficient frontier curve; and the applying of the one or more metric thresholds to the Pareto efficient frontier curve is based on the emergence of the general convex shape or the general non-convex shape of the Pareto efficient frontier curve.

In one embodiment, executing the tuning operation includes building a population of possible hyperparameter values within a hyperparameter search space based on the joint tuning function; identifying an emerged convex or non-convex shape of the Pareto efficient frontier curve; and the applying of the one or more metric thresholds to the Pareto efficient frontier curve is based on the emerged convex shape or the emerged non-convex shape of the Pareto efficient frontier curve.

In one embodiment, the Pareto efficient frontier curve relates to a curve positioned along a plurality of hyperparameter parameter values that uniformly improves both the first objective function and the second objective function of the machine learning model.

In one embodiment, a system for tuning hyperparameters for improving an effectiveness including one or more objective performance metrics of a machine learning model includes: a hyperparameter tuning service that tunes hyperparameters of the machine learning model of a subscriber to the hyperparameter tuning service, wherein the remote tuning service is implemented by a distributed network of computers that: receive a multi-criteria tuning request for tuning hyperparameters of a machine learning model, the multi-criteria tuning request includes a first objective function and a second objective function for the machine learning model, wherein the first objective function and the second objective function output metric values that do not improve uniformly; define a joint tuning function that is based on a combination of the first objective function and the second objective function; execute a tuning operation based on a tuning of the joint tuning function; identify a Pareto efficient frontier curve defined by a plurality of distinct hyperparameter values based on the execution of the tuning operation; apply one or more metric thresholds to the Pareto efficient frontier curve; demarcate the Pareto efficient frontier curve into at least a first infeasible section and a second feasible section based on the application of the one or more metric thresholds; search the second feasible section of the Pareto efficient frontier curve for one or more proposed hyperparameter values; and identify at least a first set of proposed hyperparameter values based on the search.

In one embodiment, applying the one or more metric thresholds to the Pareto efficient frontier curve includes: subjugating each of a plurality of metric values along the Pareto efficient frontier curve that do not satisfy the one or more metric thresholds, wherein the subjugation causes hyperparameter values associated with the plurality of metric values to be invisible to search.

In one embodiment, applying the one or more metric thresholds to the Pareto efficient frontier curve includes: [i] designating one or more sections of the Pareto efficient frontier curve having a plurality of metric values as valid if the plurality of metric values along the one or more sections satisfy the one or more metric thresholds; [ii] isolating the one or more sections of the Pareto efficient frontier curve from one or more other sections of the Pareto efficient frontier curve having a plurality of distinct metric values that do not satisfy the one or more metric thresholds; and [iii] extracting the one or more sections of the Pareto efficient frontier curve for performing the search based on the isolating.

In one embodiment, searching the second feasible section of the Pareto efficient frontier curve for one or more proposed hyperparameter values includes: searching for the proposed hyperparameter values within the one or more sections of the Pareto efficient curve based on the isolation and extraction.

DESCRIPTION OF THE PREFERRED EMBODIMENTS

Figure 1:
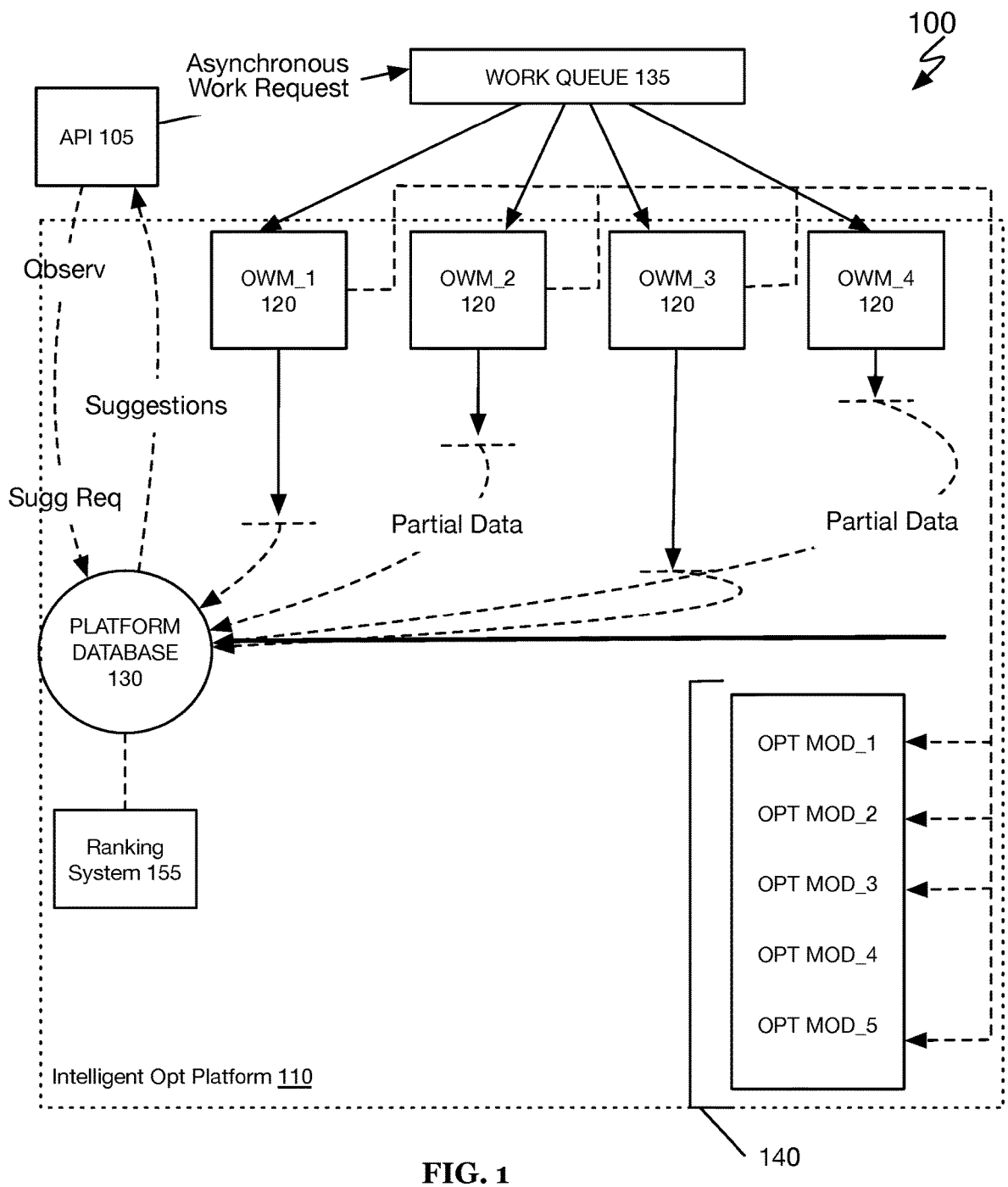
FIG. 1 illustrates a schematic representation of a tuning system 100 in accordance with one or more embodiments of the present application.

The following description of the preferred embodiments of the invention is not intended to limit the invention to these preferred embodiments, but rather to enable any person skilled in the art to make and use this invention.

Overview

The method 200 generally functions to enable a generation of Pareto optimal solution sets for optimizing competing performance objective functions of a machine learning model. For instance, it may be an objective or desire to improve, at a same time, one or more of an accuracy, an error rate, validation loss, sparsity, an efficiency (speed of prediction or inference), and/or the like for a given machine learning model. However, in many instances, if one performance objective, such as accuracy is improved, a second objective, such as predictive efficiency or speed, may be diminished or degraded for the machine learning model. Thus, in such instances, there may be significant tradeoffs in performance of disparate objectives when they are optimized independently.

Accordingly, in one or more embodiments, the method 200 may function to recognize competing performance objectives of a machine learning model in which an apparent inverse or divergent optimization relationship may exist between two distinct and/or competing performance objectives of the machine learning model. The method 200 may function to overcome this divergent optimization scenario by implementing one or more techniques that enables a joint optimization of competing performance objectives of a machine learning model that further enables a determination of hyperparameter values that optimizes both of the competing objective functions and consequently, the subject machine learning model along both of the competing performance objectives, as described in more detail below.

Additionally, the method 200 may configure an intelligent optimization platform, in response to input values provided via an intelligent Application Program Interface (API), such that the intelligent optimization platform generates multiple Pareto optimal suggestions for hyperparameter values of competing objective functions of a scalarized function. In the context of the present application, a Pareto optimal solution for a given scalarized function and/or convex combination for a machine learning model generally relates to a solution that is not strictly more optimal than another Pareto optimal solution. That is, the Pareto optimal solutions identified along the Pareto-efficient frontier define a set of solutions where a first and second competing objective may be improved without sacrificing either objective.

Additionally, in one or more embodiments of the present application, metric thresholds and/or metric constraints may be defined for improved searching of the Pareto-efficient frontier in view of one or more real-world limitations of a subject model. In particular, metric thresholds and/or metric constraints may be applied to a hyperparameter search space that include the Pareto-efficient frontier for a given model with competing metrics. In such cases, the metric thresholds and/or metric constraint reduce and/or constrain the available hyperparameters within the search space forcing a directed search along preferred sections of the Pareto-efficient frontier which may include hyperparameter values that potentially address one or more real-world limitations of a subject model.

1. A System and/or Service for Tuning a Model

As shown in FIG. 1, a tuning/optimization system 100 (model tuning service 100) includes an intelligent application program interface (API) 105, an intelligent model optimization platform 110, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features of a model, architecture of a model, and hyperparameters of a model using an ensemble of Bayesian optimization techniques, as described in U.S. Pat. No. 10,217,061, which is incorporated herein in its entirety by this reference.

The system 100 functions to implement an intelligent Application Program Interface (API) 105, as described in U.S. Pat. No. 10,282,237 which is incorporated herein in its entirety by this reference, for interacting and implementing complex optimization trials via the remote intelligent optimization platform 110. The API 105 may be specifically designed to include a limited number of API endpoints that reduce of complexity in creating an optimization work request, implementing optimization trials using the work request data, obtaining suggestions and/or results of the optimization trials, and potentially implementing an optimization feedback loop until a suitable optimization of an objective function of the work request is achieved in a minimal amount of time. The optimization work request, as referred to herein, generally relates to an API request that includes one or more hyperparameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

The API 105 may additionally be configured with logic that enables the API 105 to intelligently parse optimization work request data and/or augment the optimization work request data with metadata prior to passing the optimization work request to the shared work queue 135 of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Additionally, or alternatively, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform no. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 preferably includes a plurality of disparate optimization models that operate to optimize hyperparameters, features, models, system architectures and the like using varying optimization algorithms. In a preferred embodiment, the ensemble of optimization models 140 define a core optimization engine of the intelligent optimization platform no. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

The platform database 130 functions to collect and stores any or all values generated by the system 100 including values generated when executing an optimization work request by the intelligent optimization platform 110. Specifically, each of the plurality of intelligent queue worker machines may function to store within the platform database 130 optimized hyperparameter values, optimized hyperparameter values of an optimization work request, suggestions, surrogate models, partial information responses, and the like. The API 105 may be operable communication with the platform database 130 via a communication network and may function to pull suggestions and/or response data via an API call or request.

The machine learning models, optimization models, and/or the ensemble of machine learning models may employ any suitable optimization algorithms and/or machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate hyperparameter value data points may perform.

The system 100 may also implement a ranking system 155 that functions to rank multiple suggestions for a given optimization work request (or across multiple optimization work requests for a given user) such that the suggestions having hyperparameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

Figure 2:
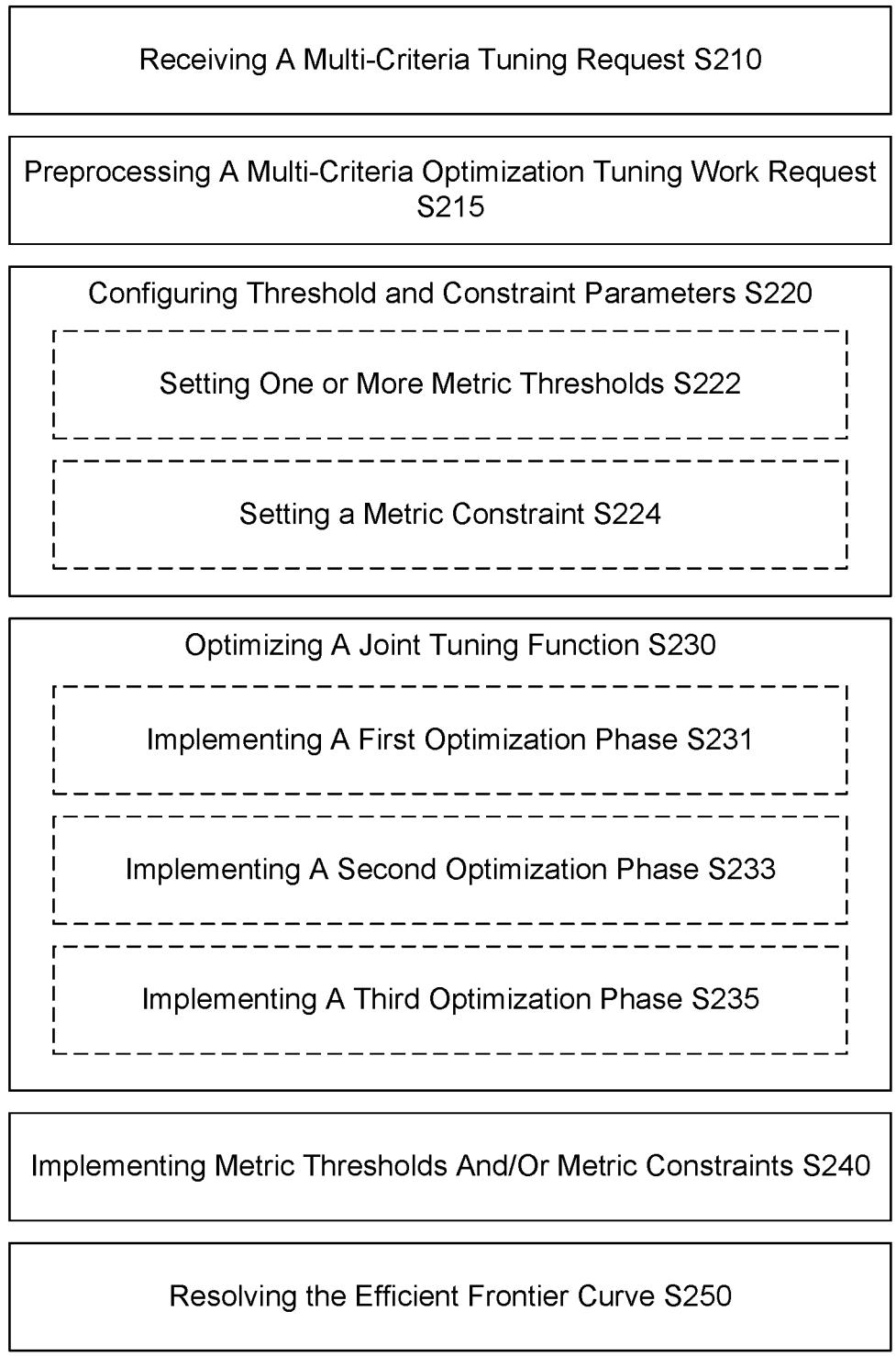
FIG. 2 illustrates an example method 200 in accordance with one or more embodiments of the present application.

2. Method for Multicriteria Hyperparameter Optimization with Metric Thresholds|Metric Constraints As shown in FIG. 2, a method 200 for multi-criteria hyperparameter optimization with one or more of metrics thresholds and metric constraints includes receiving an optimization work request S210, configuring threshold and constraint parameters S220, optimizing a joint tuning function S230, applying metric thresholds and/or a metric constraint S240, and resolving the efficient frontier curve S250. The method 200 optionally includes preprocessing a multi-criteria tuning work request S215.

The method 200 generally functions to enable a focused search for Pareto optimal solution sets that optimize competing objective functions of a model having one or more of defined metric thresholds and metric constraints. In one or more embodiments of the present application, tuning hyperparameters of a model with competing objective functions may function to yield a Pareto optimal frontier (i.e., efficient frontier) of solution sets, as described in U.S. Pat. Nos. 10,528,891 and 10,558,934, which are both incorporated herein in their entireties by this reference. While the efficiency frontier for dueling hyperparameters of a given model may include a plurality of distinct optimal solution sets that may function to dually optimize competing objective functions of the hyperparameters of a target model, in some embodiments, only a subset of the plurality of distinct optimal solution sets along the efficiency frontier may functionally address real-world constraints for implementing the model in one or more applications of a given subscriber of the hyperparameter tuning service. The hyperparameter tuning service as referred to herein preferably includes an independent tuning service at which remote subscribers of the tuning service desiring to optimize one or more hyperparameters of a subject model may submit one or more requests (via an API or the like) for tuning hyperparameters and in response, the hyperparameter tuning service may function to generate suggestions of one or more service-optimized hyperparameter values for the models of the subscribers. In a preferred embodiment, the hyperparameter tuning service may be implemented by or with the system 100 and may additionally or alternatively, implement all or parts of the method 200 (or any variations of the method 200).

Accordingly, the method 200 may function to integrate subscriber-defined metric thresholds and/or metric constraints that inform a relevant and focused search of distinct regions of the efficiency frontier of a given multi-criteria tuning experiment. Thus, inputs of one or both of metric thresholds and metric constraints may operate to create a directed or pointed search or exploration in one or more relevant regions of an efficiency frontier within a bounded hyperparameter space for two or more hyperparameters of a given model thereby improving an efficiency and/or speed for tuning hyperparameters of a model in a manner that optimizes a performance of a model in real-world, constrained applications and/or the like.

S2.10 Creating or Defining a Multi-Criteria Tuning Experiment

S210, which includes receiving an optimization work request, may function to receive an optimization work request comprising a multi-criteria optimization work request via an intelligent API or other client interface. The multi-criteria optimization work request may be referred to herein as a "multi-criteria tuning work request" or "tuning work request". Preferably, a multi-criteria optimization work request relates to an optimization or tuning request made to an intelligent optimization platform (e.g., hyperparameter tuning service) that requires an optimization or tuning of two or more criterion and/or two or more objective functions (or metrics) of a single (machine learning) model rather than an optimization of one objective function of a single model. The intelligent API of the intelligent optimization platform may be implemented as a client application accessible via a client device or other user device, such as a web browser, or any suitable interface accessible to a remote user or remote system. Within the intelligent API, a remote user or remote system may be able to create or define the multi-criteria optimization work request (or experiment) by providing one or more details of the objective functions or criteria being optimized or the one or more performance objectives that a user desires to optimize, hyperparameters and/or other features of a machine learning model along with constraints (e.g., optimization budgets, bounds, etc.) for performing the optimization trials or each tuning experiment by the intelligent optimization platform.

Accordingly, in some embodiments, a multi-criteria optimization work request may include an identification of at least a first metric (e.g., predictive accuracy) of a machine learning model and a second metric (e.g., predictive efficiency/speed) of the machine learning model that a user desires to optimize. It shall be noted that any suitable metric of a model may be identified. In such embodiments, each of the first metric and the second metric may be represented as a two-dimensional objective function, e.g., $f1(x, y)$ and $f2(x, y)$, respectively that may be either minimized or maximized according to one or more requirements of the multi-criteria tuning request. In one example, the variables x and y of each of the objective functions $f1$ and $f2$ represent prospective hyperparameter values, which may both take values in a range in the continuous interval of 0 to 1 (i.e., [0, 1]), and "x" and "y" may represent possible hyperparameter values that may operate to optimize $f1$ and $f2$, respectively. It shall be noted that, while in a preferred embodiment, the method 200 may function to implement and optimize two-dimensional objective functions, the method 200 may function to optimize any multi-dimensional objective functions including, but not limited to, three-dimensional objective functions (e.g., x, y, z) or the like.

Additionally, or alternatively, defining and/or creating a multi-criteria tuning work request includes setting (tuning) bounds for each of two or more hyperparameters forming a subject of tuning and/or optimization work request. Preferably, a tuning bound preferably relates to a full range of values that a subject hyperparameter parameter may theoretically occupy. As an example, the tuning bound for a given hyperparameter of a neural network, such as a number of neural layers, may be set to be any integer value between 0 to 100. As such, during a tuning of the hyperparameter of the neural network, the tuning service or optimization platform may theoretically return any integer value between and including 0 and 100. It shall be recognized that tuning bounds or value ranges may be normalized and/or take on other non-integer values, such as decimal values within a 0 to 1 range or the like.

S2.15 Diverging|Competing Metrics Check

Optionally or additionally, S215, which includes preprocessing a multi-criteria optimization tuning work request, may function to perform a preliminary evaluation of the two or more objective functions of the multi-criteria optimization work request to determine whether the two or more objective functions for a given machine learning model compete or diverge in performance when provided a random sample of hyperparameter values (i.e., x and y values) within each of the two or more objective functions. That is, S215 may function to identify parameter assignments who metric values cannot be improved uniformly. In some embodiments, the random hyperparameter values for each of the two or more objective functions for a given model may be generated using a low-discrepancy optimization source that may function to populate and/or compute random possible values for hyperparameters to test whether there is a uniformity in improvement or not of the objective functions.

Accordingly, S215 may function to validate whether the objective functions identified for a given optimization work request compete or generally do not improve uniformly given a same set of hyperparameter values for their respective variables. That is, in some embodiments, S215 may function to validate the divergence or competition between distinct objective functions or values of distinct metrics of a given model based on similarities or differences in the outputs of the distinct objective functions based on a similar or a same input. The input into the objective functions may be selected from possible hyperparameter values for each of the distinct objectives. In one or more embodiments, if S215 determines that two or more of the objective functions compete, S215 may function to trigger a signal for switching or selecting an optimization mode of an intelligent optimization platform that performs an optimization of the contending objective functions, as described herein.

S2.20 Configuring Thresholds and/or Constraints for a Multi-Criteria Tuning Experimentation S220, which includes configuring threshold and constraint parameters, may function to define one or more metric thresholds and/or one or more metric constraints for a subject multi-criteria tuning experiment. Specifically, in one or more embodiments, S210 may function to enable a setting or a defining of one or more metric thresholds and/or one or more metric constraints to one or more metric values or objective functions being optimized for a target model. In such embodiments, the assignment of the metric threshold and/or the metric constraint may function to state or designate a limitation to the possible metric values that may be returned for a given optimization trial or session of the hyperparameters for one or more of the metrics or objective functions of a given multi-criteria optimization request.

In one or more embodiments, S220 may function to enable setting or defining a metric threshold and/or a metric constraint as a maximum metric value or a minimum metric value for feasible metric values that may be returned for given optimization or tuning trials. That is, the metric threshold and/or metric constraint may be defined for a given tuning/optimization experiment such that points that exceed, in the case of a maximum threshold/constraint, or points that do not meet or satisfy, in the case of a minimum threshold/constraint, are avoided or made unavailable during a search for parameters values that optimize the objective functions of the experiment.

Additionally, or alternatively, a given optimization tuning request may be set with metric thresholds and/or metric constraints at any suitable time.

In a first implementation, S220 may function to enable configuring or defining the one or more of metric thresholds and/or metric constraints at the time of a creation of the multi-criteria tuning experiment. That is, S210 may enable a setting of at least one metric threshold and/or at least one metric constraint without prior performance data of a previously executed iteration of a multi-criteria experiment for hyperparameters of the target model. Accordingly, in this first implementation, the metric thresholds and/or metric constraints may be set before a creation or a discovery of the efficiency frontier for a given multi-criteria tuning experiment having competing metrics. In such embodiments, a range of hyperparameter values along a possible efficiency frontier may not be yet known and thus, metric thresholds and/or metric constraints may inadvertently be set outside of the bounds or ranges of the hyperparameter value pairings that may be most relevant for optimizing hyperparameters of a real-world constrained target model.

In a second implementation, S220 may function to enable configuring or defining the one or more of metric thresholds and/or metric constraints only after implementing and/or executing a number of iterations of the multi-criteria tuning experiment. In this implementation, the execution of a number of iterations may allow for a warm start to a focused search for optimal hyperparameters that optimize both objective functions of the multi-criteria tuning experiment. Specifically, after a number of iterations or tuning trials it may be possible that a general shape and position of the efficient frontier for the multi-criteria tuning experiment may begin to become apparent or become revealed. A general shape as referred to herein may referred to a shaping of the efficient frontier that satisfies or exceeds a shaping threshold. The shaping threshold preferably relates to a minimum shaping requirement such that when viewing a graphical illustration of a plurality of potential hyperparameter values within a hyperparameter search space a reasonable viewer may identify one of a potential convex curve or a non-convex curve being formed by a subset of the plurality of potential hyperparameter values. Thus, the application of one or more the metric thresholds and/or metric constraints may additionally allow a well-positioned search along a general position and shape of an emerging efficient frontier within multi-dimensional hyperparameter space.

In one or more embodiments, the number of iterations may be a value that satisfies a reveal threshold, where the reveal threshold relates to a minimum number of iterations, executions, or trial runs that begins to expose a convex or a non-convex shape that includes possible optimal hyperparameter values (or suggestions) for a given multi-criteria problem.

In a variant of the second implementation, S220 may function to enable configuring or defining the one or more of metric thresholds and/or metric constraints midstream experimentation trials for a given multi-criteria tuning experiment and preferably after a most probable convex or non-convex shape of the efficient frontier of possible hyperparameter values that dually optimize the multiple objective functions of the given multi-criteria tuning experiment are exposed or become most probably apparent. That is, in some embodiments, the method 200 may function to compute or make a determination regarding a confidence, a nature (e.g., an extent, position, point population, etc.) and a shaping of an emerged or a materialized convex or non-convex efficient frontier. In such embodiments, if the confidence satisfies a confidence threshold (e.g., a minimum confidence value), a nature metric satisfies or exceeds a nature threshold, and/or a shaping metric satisfies or exceeds a shaping threshold, then a system (e.g., system 100 or hyperparameter tuning service) implementing the method 200 may function to classify or label the plurality of points defining the shape and extent of the efficient frontier as an emerged or materialized frontier since the efficient frontier can be identified with high confidence (i.e., with confidence satisfying or exceeding the confidence threshold) or the like.

S2.22 Setting Metric Thresholds

S220 includes S222, which includes setting one or more metric thresholds, may function to enable a definition of one or more metric thresholds for one or more of the multiple objective functions or metrics of a given multi-criteria tuning experiment. In one embodiment, setting or defining one or more metric thresholds may include specifying a metric threshold value at a threshold input field via the intelligent API or the like when creating a given multi-criteria tuning experiment. In such embodiment, a metric threshold may be specified for any number of metrics in the given multi-criteria tuning experiment.

Additionally, or alternatively, S222 may include setting or specifying whether a metric or objective function should be maximized or minimized. In the circumstance that the tuning service or system implementing the method 200 is set for maximizing a metric or an objective function, the method 200 may function to search for observations or optimal hyperparameter values that return metric values that are greater than or equal to a specific metric threshold. Conversely, if a tuning service or system is set for minimizing a metric or an objective function, the method 200 may function to search for observations or optimal hyperparameter values that return metric values that are less than or equal to the specified metric threshold.

S2.24 Setting Metric Constraints

S220 includes S224, which includes setting a metric constraint for a second objective function of a given multi-criteria tuning experiment for optimizing a first objective function of the given multi-criteria tuning experiment. In one or more embodiments, S224 may function to enable a designation of a primary objective function and a non-primary objective function of a given multi-criteria tuning experiment. That is, in some embodiments, a primary purpose of a given multi-criteria tuning experiment may be to optimize a primary objective function subject to constraints set in a non-primary objective function.

Additionally, or alternatively, S224 may include assigning or specifying one metric or objective function of a given multi-criteria tuning experiment as a constraint metric by specifying in an input field via the intelligent API or the like when creating a given multi-criteria tuning experiment. In such embodiment, a threshold value may be set for the given constraint metric.

Additionally, or alternatively, S220 may include computing a new joint objective function based on two or more competing objective functions, preferably functions to generate a scalarized function based on the two or more competing objective functions identified in the multi-criteria optimization work request. As referred to herein, a scalarization of the two or more competing objective functions preferably relates to a creation of a single, joint objective function that combines the two or more competing objective functions of a given model in a manner that enables a joint and/or simultaneous optimization of each of the two or more competing objective functions using a single equation.

For example, the two example competing objective functions, $f1(x, y)$ and $f2(x, y)$, maybe scalarized into a single, joint objective function represented as $g(x, y)=l*f1(x, y)+(1-l)*f2(x, y)$, where the new, joint objective function that is optimized may be $g(x, y)$. Effectively, the scalarization combines at least two two-dimensional competing objective functions into a single, combined convex combination having two dimensions. The convex combination preferably defines an interplay between the two or more competing objective functions. Specifically, the interplay between the two or more competing objective functions revealed by the convex combination function may include a Pareto optimal solution along a frontier curve of points (i.e., possible solutions to the scalarized function) having generally a convex shape. Accordingly, the scalarized function g may sometimes be referred to herein as a convex combination of ƒ1 and ƒ2. Still with respect to such example, a weighting or a tuning factor represented by lambda (l) may be constrained as follows: 0<l<1, in some embodiments. The lambda value l may function to set a hyperplane and/or direction of optimization. The lambda values may generally enable a sweeping search for Pareto optimal values or define regions of search. Accordingly, lambda may function as a weighting value that may enable greater or lesser optimization emphasis of either ƒ1 or ƒ2 when its value is increased or decreased. For example, in the scalarized function, g (x, y)=l*ƒ1(x, y)+(1−l)*ƒ2(x, y), a larger lambda value may indicate a greater emphasis on the objective function f1 and a lesser emphasis on second objective function ƒ2. Conversely, a smaller lambda value may indicate a lesser emphasis on ƒ1 and a greater emphasis on ƒ2. Accordingly, during an optimization and/or a tuning of the scalarized function as described in more detail in S230, the method 200 may function to adjust values for l together with providing values for "x" and "y".

Once a scalarized function is defined for the two or more competing objective functions of a machine learning model, S220 may function to provide the scalarized function as optimization input into the one or more optimization sources of the intelligent optimization platform. That is, in one or more embodiments, the intelligent optimization platform may function to optimize the objective functions of the scalarization g (x, y). For instance, S230 may function to perform and/or execute tuning operations that operate to identify potential hyperparameter values (i.e., "x" and "y") for a given scalarized function, as described in U.S. Pat. Nos. 10,217,061 and 10,282,237, which are both incorporated herein in their entireties by this reference.

S2.3 Tuning|Optimizing a Joint Tuning Function

S230, which includes optimizing a joint tuning function, may function to configure the optimization settings of the intelligent optimization platform to enable optimization of the scalarized function for optimizing a given machine learning model. In some embodiments, a basic configuration of the intelligent optimization platform includes settings for optimization of a single objective function that may typically be a two-dimensional objective function. However, in the circumstances in which a multi-criteria optimization work request is received or detected (e.g., S215), S230 may function to switch or convert an optimization mode of the intelligent optimization platform from a first optimization mode (e.g., for optimizing a single objective function) to a second optimization mode for optimizing a generated scalarization function based on a multi-criteria optimization work request and/or based on a received optimization mode selecting or switching signal (as provided by S215).

S230 may additionally or alternatively include S231, which includes implementing a first optimization phase of the objective functions of the scalarized function of a machine learning model, functions to provide one or more parameters of the scalarized function as input into a first optimization source of the intelligent optimization platform. For instance, S231 may function to provide a minimum and maximum value for each of the two objective functions that define the scalarized function. In this first optimization phase, S231 preferably functions to explore a number of possible values for the objective functions of the scalarized function bounded between an upper and lower bound defined in the multi-criteria optimization work request. That is, S231 may function to (randomly) populate a field of potential values for each of the objective functions of the scalarized function according to one or more predetermined evaluation or testing constraints.

Figure 3:
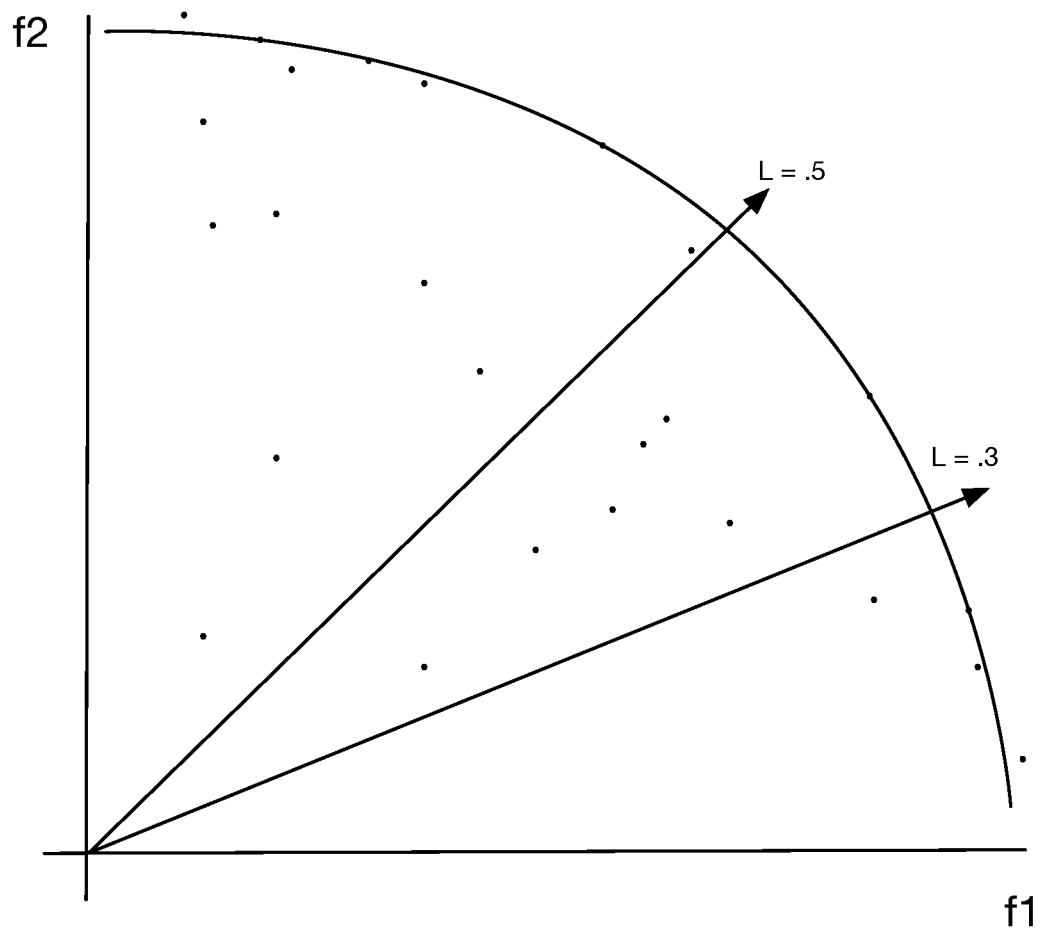
FIG. 3 illustrates an example graphical illustration of a multi-criteria optimization of a joint tuning function having a convex efficient frontier and multiple metric thresholds in accordance with one or more embodiments of the present application.

Accordingly, S231 may function to allocate a first portion (e.g., 20% of optimization budget) of an optimization budget (as further defined in the multi-criteria optimization work request) to a low-discrepancy optimization source or the like of the intelligent optimization platform. In turn, the low-discrepancy optimization source may function to generate random values for the objective functions (e.g., values of x and y for g (x, y)) of the scalarized function that, in some embodiments, may be represented along a two-dimensional plane (ƒ1–ƒ2), as shown by example, in FIG. 3. A random distribution of values for the objective functions of the scalarized function may, therefore, be identified in S231.

S230 may additionally or alternatively include S233, which includes implementing a second optimization phase of the objective functions of the scalarized function, functions to provide the scalarized function (as defined in S220) as input into a second optimization source of the intelligent optimization platform. In this second optimization phase, S233 may function to optimize values of the objective functions of the scalarized function by incrementally adjusting the scalarized function by changing a lambda value. That is, in one example, S233 may function to incrementally adjust values of lambda, l, in a sweeping fashion (or any suitable manner) between the constraints αƒ0 and 1 to generate Pareto optimal solutions sets along a Pareto-efficient frontier that may be illustrated as a convex frontier. In such example, as a lambda value of the scalarized function is incrementally adjusted or changed, S230 may function to use the second optimization source to identify and/or generate optimal hyperparameter values for the scalarized function at each given lambda setting and/or value. In this example, S230 may function to test each of the random objective function values generated by the low-discrepancy optimization source or the like within a space or region defined by a selected lambda value.

In this second optimization phase, S233 may first function to allocate a second portion (e.g., 60% of optimization budget) of an optimization budget to the second optimization source of the intelligent optimization. Preferably, S233 allocates a larger portion of the optimization budget to the second optimization phase relative to the first optimization phase (and a third optimization described further below). In some embodiments, a technical advantage of allocating a larger optimization (or testing) budget to the second optimization phase enables a well-developed Pareto-efficient frontier that represents a number of objective function values for the scalarized function that jointly optimizes each of the two competing objective functions. Accordingly, depending on a desired performance of a machine learning model, a selection of an ordered pair of objective function values along the Pareto-efficient frontier for the scalarized function should yield an optimal performance of each of the two competing objective functions of the machine learning model.

As shown in FIG. 5, S233 may function to identify a frontier (e.g., a Pareto optimal frontier) by dividing the lambda value of the scalarized function into equal parts (e.g., six equal parts or the like), in one or more embodiments, and sweeping the lambda values between each of the resulting sections of the Pareto optimal frontier. For example, if a range of lambda is between 0 and 1, [0,1], S233 may function to partition the values of lambda into four equal sections (e.g., 0-0.25, 0.26-0.50, 0.51-0.75, and 0.76-1). Specifically, in some embodiments, once the range of lambda values of the scalarized function is divided into equal parts, S233 may function to incrementally adjust the lambda value of the scalarized function within each section or sub-range and use the second optimization source to generate or identify objective function values for the scalarized function within each distinct subsection. Accordingly, after each incremental adjustment of the lambda value of the scalarized function within a divided lambda segment, the adjusted scalarized function may be provided as input into the second optimization source for generating or identifying objective function values (i.e., new ordered pairs of x and y values for g (x, y)) or new points for the scalarized function. It shall be noted that while S233 may preferably function to subdivide the total range of lambda values into equal parts, S233 may alternatively divide the total range of lambda values in any suitable manner, including unequally, randomly, or other predetermined manner. For instance, in some embodiments, failure regions for a given scalarized function may be known. In such instance, less or no optimization resources may be allocated to such failure regions by diminishing a lambda-determined search region or by eliminating the region from an optimization search all together. That is, S233 may function to exclude one or more values for lambda in which it may be known or in which there is a probability that corresponding hyperparameter values associated with a region of search set by the one or more lambda values may fail to optimize the scalarized function.

In this second optimization phase, which may also be referred to herein as the lambda sweeping phase, S233 functions to define a frontier of Pareto optimal values for the scalarization function by sweeping (e.g., incrementally adjusting a lambda value from in a range of 0 to 1 or 1 to 0 or the like). Preferably, each point on the frontier includes an ordered pair of the objective functions achievable by the machine learning model. It shall be noted that the Pareto-optimal solutions may not necessarily be unique, as there can be multiple input combinations of objective function values x and y that achieve a desired accuracy of 0.8 and efficiency of 0.2, for example. In some embodiments, the resultant Pareto optimal frontier may typically define a convex arc with a plurality of Pareto optimal parameter values defining the efficient frontier and also, surrounding lower and upper sections of the frontier and with some Pareto optimal values falling on or around the frontier arc.

S230 may additionally or alternatively include S235, which includes implementing a third optimization phase of the objective functions of the scalarized function, functions to provide the scalarized function as input into the second optimization source of the intelligent optimization platform. In this third optimization phase, S235 may function to optimize objective function values of the scalarized function by using extreme values for lambda (e.g., 0 or near 0 values and 1 or near 1 values). That is, S235 may function to select and/or adjust the lambda values of the scalarized function to lambda values near or at an upper bound of lambda (e.g., 1) and lambda values near or at a lower bound of lambda (e.g., 0). In this way, S235 may function to populate the two edges of the Pareto optimal frontier with optimized objective function values for the scalarized function. Accordingly, the best possible Pareto optimal solutions that best optimizes each of the respective two or more competing objective functions may be represented along the frontier.

S2.40 Metric Threshold

Figure 4:
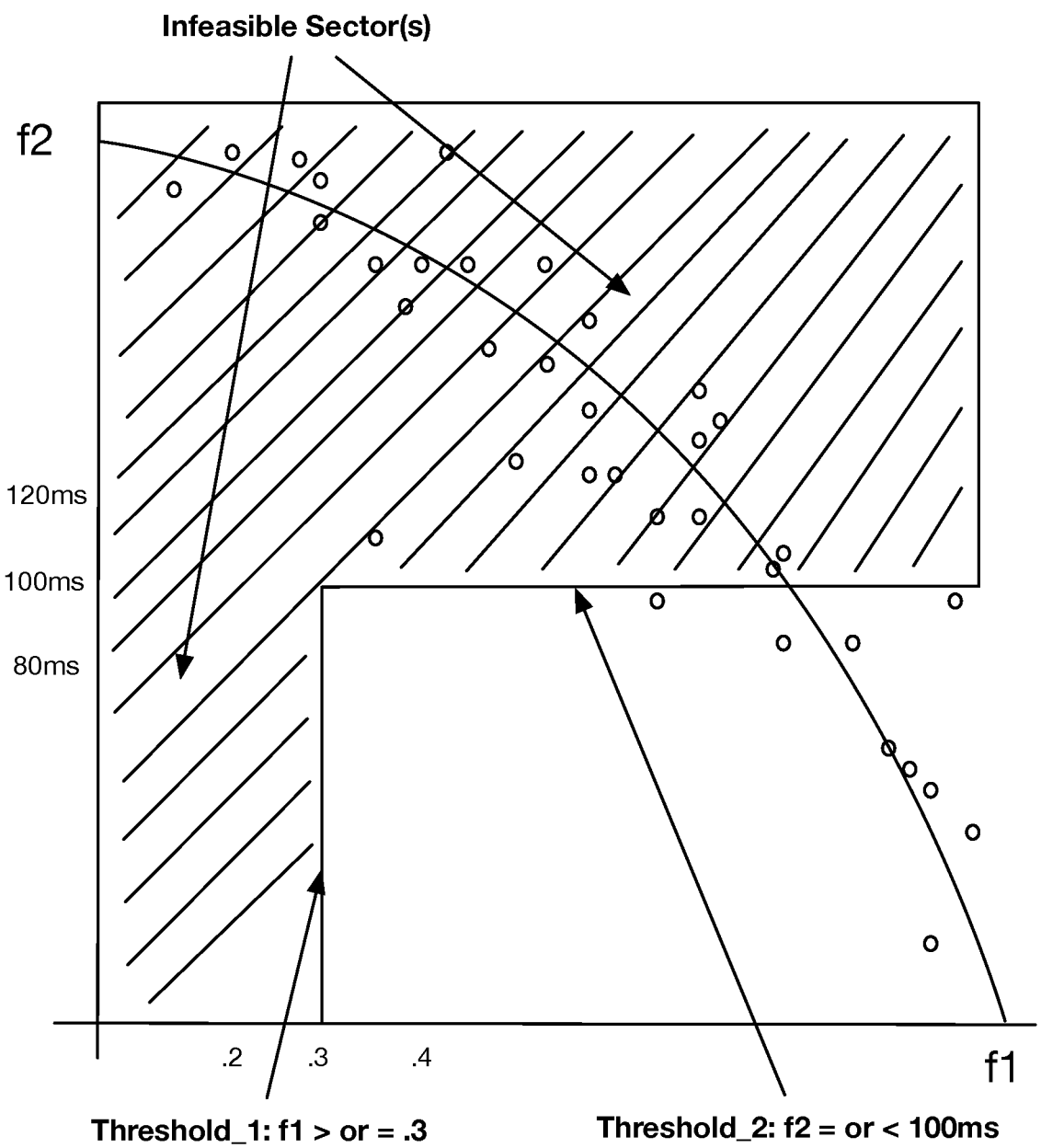
FIG. 4 illustrates an example graphical illustration of a multi-criteria optimization of a joint tuning function having a convex efficient frontier in accordance with one or more embodiments of the present application.

S240, which includes implementing one or more metric thresholds and/or a metric constraint, may function to impose each of one or more metric thresholds and/or a metric constraint along a Pareto efficient frontier for a given multi-metric tuning experiment, as shown by way of example in FIG. 4. In one or more embodiments, S240 may function to implement the one or more metric thresholds and/or metric constraint to redefine one or more explorable sectors or regions of an identified Pareto efficient frontier curve. In such embodiments, the imposition or the application of the thresholds and/or constraints renders only a subset of the Pareto efficient frontier as suitable for returning optimal observations and/or optimal hyperparameter values.

In a first implementation, implementing one or more metric thresholds and/or a metric constraint may include identifying each of a plurality of metric values along the efficient frontier curve that do not satisfy the one or more of the metric threshold(s) and/or the metric constraint and marking or designating the plurality of identified metric values as infeasible. Additionally, or alternatively, in this implementation, S240 may function to mark or designate the plurality of metric values along the efficient frontier curve that satisfy the one or more of the metric threshold(s) and/or the metric constraint as feasible.

In one or more embodiments, the feasibility designation applied to the various metric values along the efficient frontier curve may function to inform or direct a search of a system or tuning service implementing the method 200. For example, during a search along the pareto efficient curve, the method 200 may function to skip or bypass points or parameter values based on a designation of infeasible and consider or evaluate a suitability of points or metric values based on a designation of feasible.

In a first variant of this first implementation, S240 may function to designate a status of metric values of the efficient frontier curve as either available or unavailable to search based on whether the values along the efficient frontier curve satisfy or do not the one or more metric thresholds and/or metric constraint.

In a second variant of this first implementation, S240 may function to demarcate an n-dimensional parameter search space that includes the Pareto efficient frontier curve for a given multi-criteria tuning request based on an application or an imposition of the one or more metric thresholds and/or metric constraint. In this variant, S240 may function to divide the hyperparameter search space and/or divide the efficient frontier curve into at least two sectors including at least a first feasible sector and a second infeasible sector. In some embodiments, the demarcation may be of the efficient frontier curve, per se. Additionally, or alternatively, the demarcation may be of the entirety of the hyperparameter search space.

In a second implementation, implementing one or more metric thresholds and/or a metric constraint may include subjugating each of a plurality of metric values along the efficient frontier curve that do not satisfy one or more of the metric threshold(s) and/or the metric constraints. In this second implementation, S240 may function to subjugate metric values and/or the like along the efficient frontier curve by making the metric values along the efficient frontier curve with invalid values invisible or otherwise inaccessible during a search and/or exploration of the efficient frontier curve and/or search space. Thus, in some embodiments, only the one or more sections and/or metric values along the efficient frontier curve that satisfy the one or more metric thresholds and/or metric constraint may be accessible or visible during a search of the efficient frontier curve for one or more optimal suggestions.

It shall be noted that, in one or more embodiments, subjugated metric values and/or a subjugated sector of an efficient frontier curve may be illustrated or shown just as metric values that are not subjugated in a visualization or the like. However, in some embodiments, an appearance of the inaccessible or subjugated metric values within the search space may be modified to differentiate search-visible values from search-invisible values.

In a third implementation, implementing one or more metric thresholds and/or a metric constraint may include isolating and/or extracting one or more sectors or search spaces that include valid sections of the Pareto efficient curve for a given multi-criteria tuning request. In this third implementation, S240 may function to designate one or more sections of an efficient frontier curve having a plurality of metric values as valid if the metric values along the one or more sections satisfy the one or more metric thresholds and/or metric constraint. In such implementation, S240 may function to isolate and/or extract the valid section of the efficient frontier curve from an invalid section of the efficient frontier curve and make the value section of the efficient frontier curve available for search while the invalid section may not be made available for search.

In a fourth implementation, implementing one or more metric thresholds and/or a metric constraint may include rendering opaque to search each of a plurality of metric values along the efficient frontier curve that do not satisfy the one or more metric threshold(s) and/or the one or more metric constraints. In such implementation, S240 may function to maintain a transparent state and/or render transparent (or available) to searching other sections of the efficient frontier curve that satisfy the one or more metric threshold(s) and/or the one or more metric constraints. In this fourth implementation, S240 may function to an opaque virtual barrier or the like that eliminates from access or reduces a scope of search-visible metric values along either the efficient frontier curve and/or the entirety of the search space. Additionally, or alternatively, S240 may function to bypass the application of an opaque virtual barrier to each of the plurality of metric values along the efficient frontier curve that satisfy the one or more metric thresholds and/or the one or more metric constraints.

It shall be noted that S240 may function to apply the one or more metric thresholds and/or metric constraint in any suitable manner, as described above, and in some embodiments, may apply any of the above-mentioned techniques or similar application techniques in combination. Additionally, or alternatively, while S240 may generally function to apply the one or more metric thresholds and/or metric constraint granularly to distinct or individual metric values and/or parameter values along the Pareto efficient frontier, it shall be recognized that S240 may function to broadly or, in a coarse manner, apply the metric thresholds and/or metric constraint to sectors, regions, or sections of the parameter search space and/or Pareto efficient frontier curve.

Additionally, or alternatively, after and/or contemporaneous with an application of the one or more metric thresholds and/or metric constraint, S240 may function to computer generate a graphical visualization of an n-dimensional search space that includes a representation of the one or more searchable sections or parameter values of a Pareto efficient frontier together with an illustration of the one or more sections of the Pareto efficient frontier that may not be searchable or otherwise, searchable but with parameter values that may not be returned or exposed as suitable suggestions.

S2.50 Resolving|Searching the Efficient Frontier

S250, which includes resolving the Pareto efficient frontier, may function to implement a focused exploration for metric values and/or optimal hyperparameter values within one or more defined regions of the Pareto efficiency frontier curve based on an application of the one or more metric thresholds and/or constraint metric. In one or more embodiments, the implementation of the one or metric thresholds and/or metric constraint (i.e., S240) may function to refine a scope of search for Pareto optimal hyperparameter values along the Pareto efficient frontier curve. Thus, based on a technique of applying the one or more metric thresholds and/or metric constraint, S250 may function to identify and/or access the discoverable and/or searchable parameter values that may not be in some manner restricted from being returned as optimal parameter values that satisfy the competing objective functions as well as the metric value restrictions for a given multi-criteria tuning request.

As an example, in one or more embodiments, if an opaque layer or opaque virtual barrier is applied or a section of the Pareto efficient frontier curve is isolated, S250 may force or direct a search along a limited area of the search space or along a sub-section of the Pareto efficient frontier curve that may be made available in the transparent and/or isolated sub-section of the efficient frontier curve. That is, S250 may function to force or direct a search along sections of the Pareto efficient frontier curve without the restriction of the opaque virtual barrier or other obfuscating technique, as described or that may be contemplated based on the disclosure described herein.

Additionally, or alternatively, in some embodiments, while S250 may function to enable a discovery of all or several parameter values along the Pareto efficient frontier curve, S250 may function to bypass a corpus of parameter values having a restricted status or the like. For example, in one or more embodiments an application of the one or more metric thresholds and/or metric constraint may function to affect or change an availability and/or accessibility status of parameter values and/or one or more sections of the efficient frontier curve. In such embodiments, S250 may function to implement a bypass of the one or more parameter values and/or one or more sections of the efficient frontier curve having a restricted status and direct a search to other parameter values and/or sections of the efficient frontier curve not having a restricted status.

Accordingly, in one or more embodiments, based on a search of the efficient frontier curve, S250 may function to return one or more suggestions comprising hyperparameter values that jointly optimize each of a first objective function and a second objective function together with metric thresholds or constraints of a given multi-criteria tuning request.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method to tune hyperparameters of a machine learning model, the method comprising:
  defining a joint tuning function that is based on a combination of a first objective function and a second objective function, the first objective function and the second objective function from a multi-criteria tuning request to tune the hyperparameters of the machine learning model;

identifying a Pareto efficient frontier curve based on the joint tuning function;

demarcating the Pareto efficient frontier curve, based on one or more thresholds, into a first section that is available to search and a second section that is unavailable to search; and identifying, by configuring a machine, hyperparameter values from the first section of the Pareto efficient frontier curve based on the first section being available to search without causing the machine to search the second section that is demarcated as unavailable to search.

2. The method according to claim 1, including applying the one or more thresholds to the Pareto efficient frontier curve by:

identifying a first plurality of values along the Pareto efficient frontier curve that do not satisfy the one or more thresholds;

identifying a second plurality of values along the Pareto efficient frontier curve that satisfy the one or more thresholds;

setting the first plurality of values as infeasible; and
setting the second plurality of values as feasible.

3. The method according to claim 2, including searching the first section of the Pareto efficient frontier curve for one or more proposed hyperparameter values by:

bypassing hyperparameter values associated with ones of the first plurality of values; and selecting a first proposed hyperparameter value based on an evaluation of hyperparameter values associated with the second plurality of values.

4. The method according to claim 1, including applying the one or more thresholds to the Pareto efficient frontier curve by:

subjugating ones of a plurality of values along the Pareto efficient frontier curve that do not satisfy the one or more thresholds, wherein the subjugating causes hyperparameter values associated with the plurality of values to be invisible to search.

5. The method according to claim 4, including searching the first section of the Pareto efficient frontier curve for one or more proposed hyperparameter values that are visible to search.

6. The method according to claim 1, including applying the one or more thresholds to the Pareto efficient frontier curve by:

designating one or more sections of the Pareto efficient frontier curve having a plurality of values as valid if the plurality of values along the one or more sections satisfy the one or more thresholds;

isolating the one or more sections of the Pareto efficient frontier curve from one or more other sections of the Pareto efficient frontier curve having a plurality of distinct values that do not satisfy the one or more thresholds; and extracting the one or more sections of the Pareto efficient frontier curve to perform the search based on the isolating.

7. The method according to claim 6, including searching the first section of the Pareto efficient frontier curve for one or more proposed hyperparameter values by:

searching for the proposed hyperparameter values within the one or more sections of the Pareto efficient frontier curve based on the isolation and extraction.

8. The method according to claim 1, including applying the one or more thresholds to the Pareto efficient frontier curve by:

rendering opaque to search a plurality of values along the Pareto efficient frontier curve that do not satisfy the one or more thresholds, and maintaining a transparent state to search ones of a plurality of values along the Pareto efficient frontier curve that satisfy the one or more thresholds.

9. The method according to claim 8, including searching the first section of the Pareto efficient frontier curve for one or more proposed hyperparameter values by:

searching for the proposed hyperparameter values within the one or more sections of the Pareto efficient frontier curve based on the transparent state of ones of the plurality of values along the Pareto efficient frontier curve that satisfy the one or more thresholds.

10. The method according to claim 1, including:

implementing an application programming interface that is in operable communication with a hyperparameter tuning service, wherein one or more parameters of the multi-criteria tuning request are defined via the application programming interface by:

defining the first objective function, defining the second objective function, defining the one or more thresholds to constrain a hyperparameter search space.

11. The method according to claim 1, wherein the Pareto efficient frontier curve includes a curve having a convex shape; and including:

searching the first section of the Pareto efficient frontier curve for one or more proposed hyperparameter values by:

searching along the convex shape within the first section of the Pareto efficient frontier curve to identify the one or more proposed hyperparameter values.

12. The method according to claim 1, wherein the Pareto efficient frontier curve includes a curve having a non-convex shape; and including:

searching the first section of the Pareto efficient frontier curve for one or more proposed hyperparameter values by:

searching along the non-convex shape within the first section of the Pareto efficient frontier curve to identify the one or more proposed hyperparameter values.

13. The method according to claim 1, including executing a tuning operation by building a population of possible hyperparameter values within a hyperparameter search space based on the joint tuning function;

identifying an emergence of a general convex shape or a general non-convex shape of the Pareto efficient frontier curve; and applying the one or more thresholds to the Pareto efficient frontier curve based on the emergence of the general convex shape or the general non-convex shape of the Pareto efficient frontier curve.

14. The method according to claim 1, including executing a tuning operation by building a population of possible hyperparameter values within a hyperparameter search space based on the joint tuning function;

identifying an emerged convex shape or an emerged non-convex shape of the Pareto efficient frontier curve; and applying the one or more thresholds to the Pareto efficient frontier curve based on the emerged convex shape or the emerged non-convex shape of the Pareto efficient frontier curve.

15. The method according to claim 1, wherein the Pareto efficient frontier curve relates to a curve positioned along a plurality of hyperparameter parameter values that uniformly improves both the first objective function and the second objective function of the machine learning model.

16. A system to tune hyperparameters of a machine learning model, the system comprising:
   interface circuitry;
   instructions; and
   at least one computer operable, based on the instructions, to:
   define a joint tuning function that is based on a combination of a first objective function and a second objective function, the first objective function and the second objective function from a multi-criteria tuning request to tune the hyperparameters of the machine learning model;
   identify a Pareto efficient frontier curve based on the joint tuning function;
   demarcate the Pareto efficient frontier curve, based on one or more thresholds, into a first section that is available to search and a second section that is unavailable to search; and
   identify hyperparameter values from the first section of the Pareto efficient frontier curve based on the first section being available to search without the at least one computer searching the second section that is demarcated as unavailable to search.

17. The system according to claim 16, wherein the at least one computer is to apply the one or more thresholds to the Pareto efficient frontier curve by:
   subjugating ones of a plurality of values along the Pareto efficient frontier curve that do not satisfy the one or more thresholds, wherein the subjugating causes hyperparameter values associated with the plurality of values to be invisible to search.

18. The system according to claim 16, wherein the at least one computer is to apply the one or more thresholds to the Pareto efficient frontier curve by:
   designating one or more sections of the Pareto efficient frontier curve having a plurality of values as valid if the plurality of values along the one or more sections satisfy the one or more thresholds;
   isolating the one or more sections of the Pareto efficient frontier curve from one or more other sections of the Pareto efficient frontier curve having a plurality of distinct values that do not satisfy the one or more thresholds; and
   extracting the one or more sections of the Pareto efficient frontier curve to perform a search of the first section based on the isolating.

19. The system according to claim 18, wherein the at least one computer is to search the first section of the Pareto efficient frontier curve for one or more proposed hyperparameter values includes:
   searching for the proposed hyperparameter values within the one or more sections of the Pareto efficient frontier curve based on the isolation and extraction.

20. The system according to claim 16, wherein the first objective function and the second objective function generate metric values that do not improve uniformly.

* * * * *